(12) United States Patent
Friedman et al.

(10) Patent No.: US 8,903,841 B2
(45) Date of Patent: Dec. 2, 2014

(54) SYSTEM AND METHOD OF MASSIVELY PARALLEL DATA PROCESSING

(75) Inventors: Eric Friedman, Mountain View, CA (US); Peter Pawlowski, Menlo Park, CA (US)

(73) Assignee: Teradata US, Inc., Dayton, OH (US)

( * ) Notice: Subject to any disclaimer, the term of this patent is extended or adjusted under 35 U.S.C. 154(b) by 603 days.

(21) Appl. No.: 12/784,527

(22) Filed: May 21, 2010

(65) Prior Publication Data

US 2010/0241646 A1  Sep. 23, 2010

Related U.S. Application Data

(63) Continuation of application No. 12/406,875, filed on Mar. 18, 2009, now abandoned.

(51) Int. Cl.
*G06F 17/30* (2006.01)

(52) U.S. Cl.
CPC ................ *G06F 17/30445* (2013.01)
USPC ............ 707/764; 707/765; 707/770; 714/746

(58) Field of Classification Search
CPC .................. G06F 17/30445; G06F 17/30932; G06F 17/30575; G06F 17/30463
See application file for complete search history.

(56) References Cited

U.S. PATENT DOCUMENTS

| | | | | |
|---|---|---|---|---|
| 5,313,629 | A | * | 5/1994 | Abraham et al. ............ 707/792 |
| 5,613,071 | A | | 3/1997 | Rankin et al. |
| 5,634,053 | A | * | 5/1997 | Noble et al. ................... 1/1 |
| 5,797,000 | A | * | 8/1998 | Bhattacharya et al. ....... 707/764 |
| 5,905,982 | A | | 5/1999 | Carey et al. |
| 5,943,663 | A | | 8/1999 | Mouradian |
| 6,067,542 | A | | 5/2000 | Carino, Jr. |
| 6,112,198 | A | | 8/2000 | Lohman et al. |
| 6,202,067 | B1 | * | 3/2001 | Blood et al. ................. 707/613 |
| 6,243,710 | B1 | | 6/2001 | DeMichiel et al. |
| 6,339,769 | B1 | | 1/2002 | Cochrane et al. |
| 6,457,020 | B1 | | 9/2002 | Carey et al. |
| 6,604,096 | B1 | | 8/2003 | Couch et al. |

(Continued)

FOREIGN PATENT DOCUMENTS

| | | | |
|---|---|---|---|
| CN | 11350023 A | 1/2009 | |
| EP | 2063364 A1 | 5/2009 | |
| WO | WO 0267145 A2 * | 8/2002 | ............. G06F 17/30 |

OTHER PUBLICATIONS

"Query Evaluation Techniques for Large Databases," by Graefe. ACM press, vol. 25, No. 2, Jun. 1993, pp. 73-170. Available at: ACM.*

(Continued)

*Primary Examiner* — Daniel Kinsaul
(74) *Attorney, Agent, or Firm* — Raj Alohyanker, LLP; Randy L. Campbell, Jr.

(57) ABSTRACT

A system and method of massively parallel data processing are disclosed. In an embodiment, a method includes generating an interpretation of a customizable database request which includes an extensible computer process and providing an input guidance to available processors of an available computing environment. The method further includes automatically distributing an execution of the interpretation across the available computing environment operating concurrently and in parallel, wherein a component of the execution may be limited to at least a part of an input data. The method also includes automatically assembling a response using a distributed output of the execution.

4 Claims, 10 Drawing Sheets

(56) References Cited

U.S. PATENT DOCUMENTS

| | | | |
|---|---|---|---|
| 6,618,718 B1 | 9/2003 | Couch | |
| 6,625,593 B1* | 9/2003 | Leung et al. | 1/1 |
| 6,775,662 B1 | 8/2004 | Witkowski et al. | |
| 6,961,723 B2 | 11/2005 | Faybishenko et al. | |
| 7,299,225 B2 | 11/2007 | Tran et al. | |
| 7,321,891 B1 | 1/2008 | Ghazal | |
| 7,409,386 B2 | 8/2008 | Hongell et al. | |
| 7,430,549 B2 | 9/2008 | Zane et al. | |
| 7,447,678 B2 | 11/2008 | Taylor et al. | |
| 7,461,051 B2 | 12/2008 | Lavine | |
| 7,478,080 B2 | 1/2009 | Pirahesh et al. | |
| 7,533,088 B2 | 5/2009 | Nayak et al. | |
| 7,539,660 B2 | 5/2009 | Focazio et al. | |
| 7,542,990 B2 | 6/2009 | Paval | |
| 7,565,342 B2 | 7/2009 | Fuh et al. | |
| 7,565,345 B2 | 7/2009 | Bailey et al. | |
| 7,565,370 B2 | 7/2009 | Milenova et al. | |
| 7,567,945 B2 | 7/2009 | Ali | |
| 7,590,626 B2 | 9/2009 | Li et al. | |
| 7,593,931 B2 | 9/2009 | Zuzarte et al. | |
| 7,599,912 B2 | 10/2009 | Blumenschein et al. | |
| 7,617,186 B2 | 11/2009 | Scherer et al. | |
| 7,617,205 B2 | 11/2009 | Bailey et al. | |
| 7,627,567 B2 | 12/2009 | Ganti et al. | |
| 7,636,701 B2 | 12/2009 | Funge et al. | |
| 7,640,230 B2 | 12/2009 | Hanson et al. | |
| 7,640,237 B2 | 12/2009 | Bangel et al. | |
| 7,640,238 B2 | 12/2009 | Mordvinov et al. | |
| 7,644,062 B2 | 1/2010 | Su et al. | |
| 7,647,286 B2 | 1/2010 | Friedlander et al. | |
| 7,647,298 B2 | 1/2010 | Adya et al. | |
| 7,650,357 B2 | 1/2010 | Lin et al. | |
| 7,657,516 B2 | 2/2010 | Zaman et al. | |
| 7,660,811 B2 | 2/2010 | Netz et al. | |
| 7,668,801 B1 | 2/2010 | Koudas et al. | |
| 7,668,806 B2 | 2/2010 | Liu et al. | |
| 7,668,807 B2 | 2/2010 | Dettinger et al. | |
| 7,668,818 B2 | 2/2010 | Hou et al. | |
| 7,668,819 B2 | 2/2010 | Bangel et al. | |
| 7,668,858 B2 | 2/2010 | Lowe et al. | |
| 7,672,925 B2 | 3/2010 | Kirk et al. | |
| 7,672,934 B1 | 3/2010 | Beatty et al. | |
| 7,676,452 B2 | 3/2010 | Doganata et al. | |
| 7,676,453 B2 | 3/2010 | Ozbutun | |
| 7,680,746 B2 | 3/2010 | Agarwal | |
| 7,680,765 B2* | 3/2010 | Meijer et al. | 707/764 |
| 7,680,774 B2 | 3/2010 | Bahulkar et al. | |
| 7,680,775 B2 | 3/2010 | Levin et al. | |
| 7,680,779 B2 | 3/2010 | Chaves | |
| 7,680,784 B2 | 3/2010 | Furuya et al. | |
| 7,680,787 B2 | 3/2010 | Giulio | |
| 7,685,083 B2 | 3/2010 | Fairweather | |
| 7,685,086 B2 | 3/2010 | Brown et al. | |
| 7,685,101 B2 | 3/2010 | Day et al. | |
| 7,685,119 B2 | 3/2010 | Riise et al. | |
| 7,689,534 B2 | 3/2010 | Konik et al. | |
| 7,844,620 B2* | 11/2010 | Barsness et al. | 707/764 |
| 7,984,043 B1* | 7/2011 | Waas | 707/718 |
| 8,386,440 B2* | 2/2013 | Lomet et al. | 707/676 |
| 2002/0059267 A1 | 5/2002 | Shah et al. | |
| 2003/0191759 A1 | 10/2003 | Harvey | |
| 2003/0195869 A1 | 10/2003 | Bhattacharjee et al. | |
| 2004/0024720 A1 | 2/2004 | Fairweather | |
| 2004/0098390 A1* | 5/2004 | Bayliss et al. | 707/7 |
| 2004/0103082 A1 | 5/2004 | Tran et al. | |
| 2005/0027690 A1 | 2/2005 | Zhang et al. | |
| 2007/0073676 A1 | 3/2007 | Carlson et al. | |
| 2007/0112714 A1 | 5/2007 | Fairweather | |
| 2007/0208726 A1 | 9/2007 | Krishnaprasad et al. | |
| 2008/0021893 A1 | 1/2008 | Bakalash et al. | |
| 2008/0021915 A1 | 1/2008 | Bakalash et al. | |
| 2008/0040334 A1 | 2/2008 | Haber et al. | |
| 2008/0040365 A1 | 2/2008 | Harvey | |
| 2008/0126297 A1 | 5/2008 | Rowley | |
| 2008/0147596 A1 | 6/2008 | McKenna et al. | |
| 2008/0147599 A1* | 6/2008 | Young-Lai | 707/2 |
| 2008/0147627 A1 | 6/2008 | Natkovich et al. | |
| 2008/0154940 A1 | 6/2008 | Lee et al. | |
| 2008/0162445 A1 | 7/2008 | Ghazal | |
| 2008/0183688 A1* | 7/2008 | Chamdani et al. | 707/4 |
| 2008/0183741 A1 | 7/2008 | Gaurav et al. | |
| 2008/0189243 A1 | 8/2008 | Li et al. | |
| 2008/0189258 A1 | 8/2008 | Miejer et al. | |
| 2008/0275841 A1 | 11/2008 | Keller et al. | |
| 2008/0281802 A1 | 11/2008 | Peterson et al. | |
| 2008/0294615 A1 | 11/2008 | Furuya et al. | |
| 2009/0012778 A1 | 1/2009 | Feng et al. | |
| 2009/0043745 A1 | 2/2009 | Barsness et al. | |
| 2009/0043910 A1* | 2/2009 | Barsness et al. | 709/237 |
| 2009/0049024 A1 | 2/2009 | Brown et al. | |
| 2009/0063441 A1 | 3/2009 | Styles | |
| 2009/0112913 A1 | 4/2009 | Murthy et al. | |
| 2009/0138455 A1 | 5/2009 | Copello | |
| 2009/0157623 A1 | 6/2009 | Bedi et al. | |
| 2009/0228465 A1 | 9/2009 | Krishnamurthy et al. | |
| 2009/0248638 A1 | 10/2009 | Hughes | |
| 2009/0249125 A1 | 10/2009 | Bhatawdekar et al. | |
| 2009/0265320 A1 | 10/2009 | Kelley | |
| 2009/0271362 A1 | 10/2009 | Moestl | |
| 2009/0271379 A1 | 10/2009 | Bakalash et al. | |
| 2009/0276410 A1 | 11/2009 | Bakalash et al. | |
| 2009/0300037 A1 | 12/2009 | Kariv | |
| 2009/0319499 A1 | 12/2009 | Meijer et al. | |
| 2010/0017380 A1 | 1/2010 | Naibo et al. | |
| 2010/0030756 A1 | 2/2010 | Ahmed et al. | |
| 2010/0030757 A1 | 2/2010 | Chordia et al. | |
| 2010/0030774 A1 | 2/2010 | Dettinger et al. | |
| 2010/0057705 A1 | 3/2010 | Coutts et al. | |
| 2010/0070521 A1 | 3/2010 | Clinchant et al. | |
| 2010/0198855 A1* | 8/2010 | Ranganathan et al. | 707/764 |

OTHER PUBLICATIONS

"Parallel Database Systems: the Future of High Performance Database Processing," In: Communication of the ACM, vol. 36, No. 6, Jun. 1992, pp. 1-26. Available at: ACM.*

"Database Connectivity Using an Agent-Based Mediator System," by Stephens and Huhns. In: Univ. of S. Carolina, report A38, 1999; available online at http://citeseerx.ist.psu.edu/viewdoc/download-?doi=10.1.1.93.1226&rep=rep1&type=pdf Last visited: Mar. 12, 2011.*

"A Scalable Implementation of Fault Tolerance for Massively Parallel Systems," by Deconinck et al. In: Proc. $2^{nd}$ Int'l Conf. on Massively Parallel Computing Systems (1996) pp. 214-221. Available at: http://s-space.snu.ac.kr/handle/10371/6861 (last visited Jun. 4, 2013). Also IEEE.*

"Fault Tolerance in Massively Parallel Systems," by Doconinck et al. In: Transputer Communications, vol. 2(4), pp. 241-257 (1994). Available at: http://www.esat.kuleuven.be/electa/publications/fulltexts/pub_823.pdf (last visited Jun. 4, 2013).*

"Query Expansion Using Associated Queries," by Billerbeck et al. In: CIKM'03, Nov. 3-8, 2003. Available at: ACM.*

"Concept Based Query Expansion," by Qiu et al. In: ACM-SIGIR'93 (1993). Aavailable at: ACM.*

"Load Balancing for Term-Distributed Parallel Retrieval," by Moffat et al. In: SIGIR'06 (2006). Available at: ACM.*

"Understanding Fault-Tolerant Distributed Systems," by Cristian, Flaviu. In: Comm. ACM, vol. 34, Is. 2 (1991). Available at: ACM.*

* cited by examiner

SYSTEM AND METHOD OF MASSIVELY PARALLEL DATA PROCESSING

CLAIM OF PRIORITY

This is an accelerated examination application and claims priority from U.S. Utility application Ser. No. 12/406,875 titled "INTERPRETATION AND EXECUTION OF A CUSTOMIZABLE DATABASE REQUEST USING AN EXTENSIBLE COMPUTER PROCESS AND AN AVAILABLE COMPUTING ENVIRONMENT" filed on Mar. 18, 2009.

FIELD OF TECHNOLOGY

This disclosure relates generally to data processing systems and methods, and in particular to a system and method of massively parallel data processing.

BACKGROUND

Large-scale data processing may involve extracting data of interest from raw data in one or more datasets and processing it into a useful data product. A database analyst may seek to request information from a database but may be prevented from doing so by a lack of an ability to customize a database query. The database analyst may also be unable to distribute the processing of the query across a distributed computational environment, which may include one or more servers. The database analyst may be restricted to a limited set of queries that may limit the effectiveness of the analyst's ability to obtain information from the database. The analyst may therefore seek data inefficiently using an excessive number of queries. The data analyst may also be required to transfer the processed information of the database to a separate process to analyze the data. The database analyst may therefore be required to spend an excessive amount of time obtaining information, which may lead to a delay, an additional cost of the analyst's time, an additional time for a processor usage, and a greater possibility of incurring a human made error. As a result, the database analyst may ultimately fail to find a desired information.

SUMMARY

A system and method of massively parallel data processing are disclosed. In an aspect, a method includes generating an interpretation of a customizable database request which includes an extensible computer process and providing an input guidance to available processors of an available computing environment. The method further includes automatically distributing an execution of the interpretation across the available computing environment operating concurrently and in parallel, wherein a component of the execution is limited to at least a part of an input data. The method also includes automatically assembling a response using a distributed output of the execution.

The input guidance may be provided to each of the available processors and may be comprised of certain portions of the input data. The input guidance may be used to determine which of the available processors are to perform functions related to the at least the part of the input data. The method may further include providing an information to the extensible computer process about its context in the customizable database request, and processing an interpretation of the customizable database request based on the information provided. The extensible computer process may be a developer provided-computer program, and the information provided may include at least one of a format of the input data and an output data, whether the input data and the output data is ordered and in which form, grouping information, statistics of the input data and the output data, a distribution information, a length of the input data and the output data, and a custom parameter.

The custom parameter may be at least one of a number, a string, a list of numbers of strings, a content of a file in the available computing environment, and a result of the customizable database request. The method may further include post processing an output of each of the available processors when automatically assembling the response. The post processing may include at least one database operation including at least one of an aggregation operation, a sorting operation, and an invocation of another extensible computer process.

The method may further include pre-processing an input of each of the available processors when providing the input guidance to the available processors. The available computing environment may be comprised of at least two servers. The customizable database request may specify the input data for the extensible computer process. The input data may be structured in a form comprising at least one of a database table and an output of a different database query.

The input data may be unstructured in a form comprising a content of at least one file in a computing environment. The method may further include detecting a fault in the execution of the interpretation, and automatically rectifying an output effect of the fault. Rectifying the output effect of the fault may include at least one of reprocessing an operation, excluding a corrupted data, and logging the corrupted data. The customizable database request may be comprised of at least one of a predetermined function, a developer created function, and an analyst created function.

In another aspect, a system may include a query planning module to generate an interpretation of a database request which includes an extensible computer process, and a parallelization module to provide an information to available processors of an available computing environment and to automatically distribute an execution of the interpretation across the available computing environment operating concurrently and in parallel. A component of the execution may be limited to at least a part of an input data. The system may further include a response organization module to automatically assemble a response using a distributed output of the execution.

The information may be used to provide each of the available processors certain portions of the input data, and to determine which of the available processors are to perform functions related to the at least the part of the input data. The system may include a reference module to provide an extensible computer process information about its context in the database request. The system may include a dynamic interpretation module to process information that affects the interpretation of the database request based on the information provided, wherein the extensible computer process is a developer provided-computer program.

The information provided may include a format of the input data and an output data, whether the input data and the output data is ordered and in which form, grouping information, statistics of the input data, a distribution information, a length of the input data and the output data, and custom parameters. The custom parameters may be at least one of a number, a string, a list of numbers of strings, a content of a file in the available computing environment, and a result of the database request.

In yet another aspect, a method includes generating an interpretation of a customizable database request which includes an extensible computer process, and providing an input guidance to available processors of an available computing environment. The input guidance determines which of the available processors are to perform functions related to the at least a part of an input data. The method further includes pre-processing an input of each of the available processors when providing the input guidance to the available processors, and automatically distributing an analysis phase of the interpretation across the available computing environment operating concurrently and in parallel. A component of the analysis phase is limited to at least a part of the input data.

The method further includes automatically distributing an additional analysis phase of the interpretation across the available computing environment, and automatically assembling a response using a distributed output of the additional analysis phase. The method also includes post processing an output of each of the available processors when automatically assembling the response. The post processing includes at least one database operation including one or more of an aggregation operation, a sorting operation, and an invocation of another extensible computer process.

The method may include providing an extensible computer process information about its context in the customizable database request, and processing information that affects the interpretation of the customizable database request based on the information provided. In the aspect, the extensible computer process is a developer provided-computer program, and the information provided includes at least one of a format of the input data and an output data, whether the input data and the output data is ordered and in which form, grouping information, statistics of the input data, a distribution information, a length of the input data and the output data, and custom parameters. The custom parameters are one or more of a number, a string, a list of numbers of strings, a content of a file in the available computing environment, and a result of the customizable database request.

Other aspects and example embodiments are provided in the drawings and the detailed description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A system and method of massively parallel data processing are disclosed. Although the present embodiments have been described with reference to specific example embodiments, it will be evident that various modifications and changes may be made to these embodiments without departing from the broader spirit and scope of the various embodiments.

Figure 1:
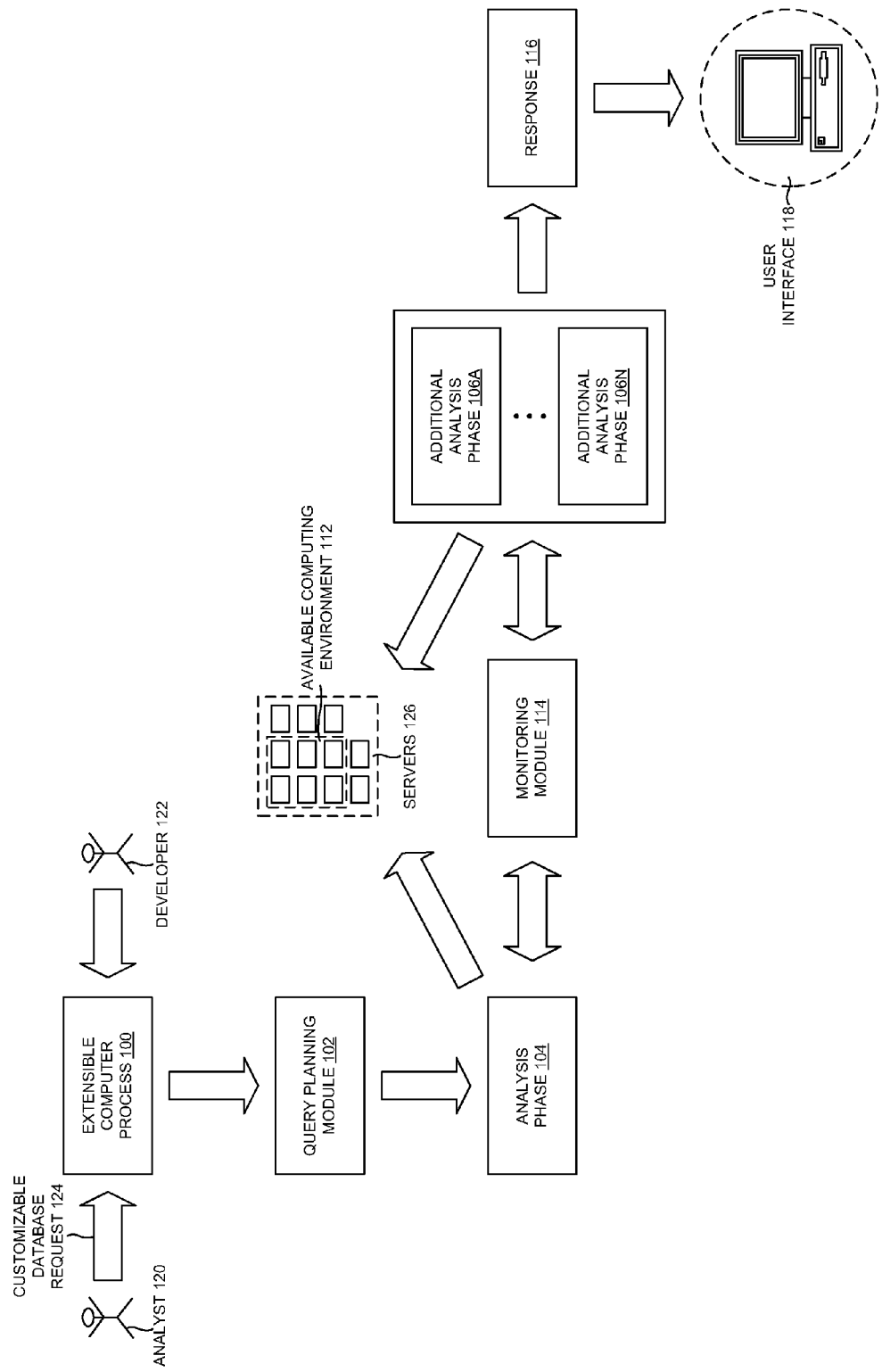
FIG. 1 is a system view illustrating processing of a customizable database query using a developer extensible operation and an available computing environment, according to one embodiment.

FIG. 1 is a system view illustrating processing of a customizable database query using a developer extensible operation and an available computing environment, according to one embodiment. In particular, FIG. 1 illustrates an extensible computer process 100, a query planning module 102, an analysis phase 104, an additional analysis phase 106A-N, an available computing environment 112, a monitoring module 114, a response 116, a user interface 118, an analyst 120, a developer 122, a customizable database request 124, and servers 126.

FIG. 1 illustrates an analyst 120 providing a customizable database request 124 to an extensible computer process 100. The analyst 120 may be a database analyst who is familiar with SQL (e.g., a Structured Query Language). SQL may be a database computer language designed for the retrieval and management of data in relational database management systems (RDBMS), database schema creation and modification, and database object access control management. The analyst 120 may have limited knowledge of other programming languages, and may have a substantially limited ability to create programs, to modify software, and to manage software distributed across multiple processors. The analyst 120 may be tasked with searching for data rather than developing programs.

The customizable database request 124 may consist of a SQL instruction and/or it may be written in any programming language. The customizable database request 124 may be customized to include a function (e.g., a nested SQL command, a mathematical equation, a variable, a standard deviation, etc.). The function may be created by the analyst 120, the developer 122, and/or it may be a predetermined function. The function may be customized to search multiple records at once, to retrieve and/or manipulate data in multiple forms (e.g., tables, images, unstructured data 584, text files, programs, sound files, photos, etc.). The function may access data in one form and generate data in another form. The customizable database request 124 may further specify an input data 510 for the extensible computer process 100.

The customizable database request 124 may allow the process to be scaled in accordance with a changing system hardware and/or performance of a system. The function may allow user-implemented procedural code to be uploaded to a database and executed at each node of a system. A user (e.g., an analyst 120, a developer 122, etc.) may provide code that may operate on individual rows and/or on groups of rows. The customizable database request 124 may take in input using a set of rows in a table (e.g., a persistent table in a database, the output of a SQL SELECT statement and/or the output of another function, etc.). The customizable database request 124 may result in an output that includes a relation of a set of rows (e.g., an output unrelated to the input.) The customizable database request 124 and/or a function of the customizable database request 124 may be placed into a SQL SELECT query and/or any other query as though it were itself a table. This integration with SQL may allow for composing SQL and procedural code invocations in any form and shape. The code may be written in Java, Python, and/or any other language.

In an embodiment, the customizable database request 124 may include a function that is written in Java that is then invoked as part of a SQL query statement. The function may be parallelized to operate on rows across multiple nodes simultaneously. The function may be invoked on arbitrary sets of rows and/or rows grouped together by a PARTITION BY clause. Within a partition, rows may be further sorted using an ORDER BY clause.

In an embodiment, a function may split strings into words. In the embodiment, the function may be invoked once for every row in an input table. The function may include Java procedural code that takes each document and emits a row for each word. The function may define a column that appears in its output rows. In another embodiment, a function may be created to compute the 10 most-frequently occurring words in a body of text using the function to split strings into words.

In yet another embodiment, a function of the customizable database request 124 may perform sessionization by mapping each click in a clickstream to a unique session identifier. The function may define a session as a sequence of clicks by a particular user where no more than 'n' seconds pass between successive clicks (e.g., if a click from a user isn't seen for n seconds, a new session is started). The function may use an userid and/or a timestamp attribute. The function may include as parameters the name of the timestamp attribute, the number of seconds between clicks that results in starting a new session. A clickstream table may be partitioned by userid, and partition tuples may be sequenced by timestamp. The sessionize function may then be invoked against each of the ordered partitions and/or emit the input tuples with an appropriate sessionid added.

The customizable database request 124 may be received by an extensible computer process 100, which may be designed to take into consideration future growth by allowing the addition and/or modification of functionality. The addition of new functionality and/or the modification of existing functionality may be accomplished with limited impact to existing system functions. A developer 122 may be familiar with a type of programming involving database analysis, query modification, and/or data searches. The developer 122 may possess limited knowledge regarding programs to distribute an analysis across multiple computing systems. The developer 122 may support and/or design software for the analyst 120. The developer 122 may adapt the extensible computer process 100 to add new functions, modify existing functions, and/or add additional language ability to the software.

The extensible computer process 100 may communicate with a query planning module 102 to generate a query interpretation of the customizable database request 124. The query interpretation may be formatted to be distributable (e.g., separated into individual tasks for separate processes, etc.). The query interpretation may convert the customizable database request 124 from any computer language (e.g., a machine-readable artificial language designed to express computations that can be performed by a machine, C++, SQL, Perl, Java, Prolog, etc.) into a preferred programming language. The query interpretation may automatically format the customizable database query to be processed using a distributable, multiphase analysis.

The query planning module 102 may generate an interpretation (e.g., the query interpretation) of the customizable database request, which may include an extensible computer process. The query planning module 102 may optimize the analysis phase and/or the additional analysis phase using a parameter (e.g., an expected output file size, an input file format, a table dimension, etc.). The query planning module 102 may provide an input guidance to available processors of the available computing environment. The input guidance may include certain portions of the input data, and the input guidance may be used to determine which of the available processors are to perform functions related to different parts of the input data.

The query planning module 102 may use the parameter to allocate a system resource (e.g., memory, power supply output, processor usage, a number of servers applied, a sequence of processors used, a timing of processes analyzed, etc.). The allocation of a system resource may include a distribution of processes across an available computing environment 112, a selection of a type of analysis to apply, and/or a selection of input data to review. The execution of the interpretation may be automatically distributed across an available computing environment operating concurrently and in parallel, and a component of the execution may be limited to a part of the input data. The part of the input data may be a subset of the input data, which may allow the execution to be divided into separate tasks to be processed by different machines.

The available computing environment 112 (e.g., networked processors, virtual machines, multiple processors of a server, multiple servers 126A-N and 128A-N, etc.) may be comprised of servers that are and/or will be available to process data. The available computing environment 112 may be better illustrated in FIG. 2.

The query interpretation may be dynamically determined based on a context (e.g., a repeated pattern of requested information, an association between an analyst's customizable database request 124 and an input data 510, an available input data 510, etc.). The context of the customizable database request 124 may include the type of requested information, the language of the request, and/or the expected response 116. For example, if the analyst's request includes a name and address, the analysis phase 104 and/or the additional analysis phase 106A-N may be configured to provide a response 116 that includes GPS coordinates (e.g., latitude and/or longitude, etc.). In another embodiment, the query interpretation may automatically provide alternate responses based on a variation of the requested parameters, such as by expanding or contracting a search parameter to provide alternate responses, varying search parameters, and searching for peak values.

The interpretation of the customizable database request generated by the query planning module 102 may be processed based on a contextual information provided to the extensible computer process. The extensible computer process may be a developer provided-computer program. The information provided may include a format of the input data and the output data, whether the input data and the output data are ordered and in which form, grouping information, statistics of the input data and the output data, a distribution information, a length of the input data and the output data, and a custom parameter.

The custom parameter may be a number, a string, and/or a list of numbers of strings. The custom parameter may further include a content of a file in the available computing environment, and/or a result of the customizable database request (e.g., the response 116).

The query interpretation generated by the query planning module 102 may be communicated to an analysis phase 104, which may be automatically distributed across an available computing environment 112. The automatic distribution of the query interpretation may allow separate machines to analyze the query using portions of an input data 510 simultaneously, in parallel, in an overlapping sequence, and/or in series.

The analysis phase 104 may include a component that is limited to a part of the input data 510. The component may process a part of a "map" phase of a MapReduce analysis (e.g., a framework for computing a distributable problem). The component may process a part of the analysis phase 104 using its part of the input data 510. The analysis phase 104 may also include an additional component that uses the output of the component to generate an additional output (e.g., the additional component operates in series with the component, the additional component uses the output of the component as one of several inputs, etc.).

Figure 5:
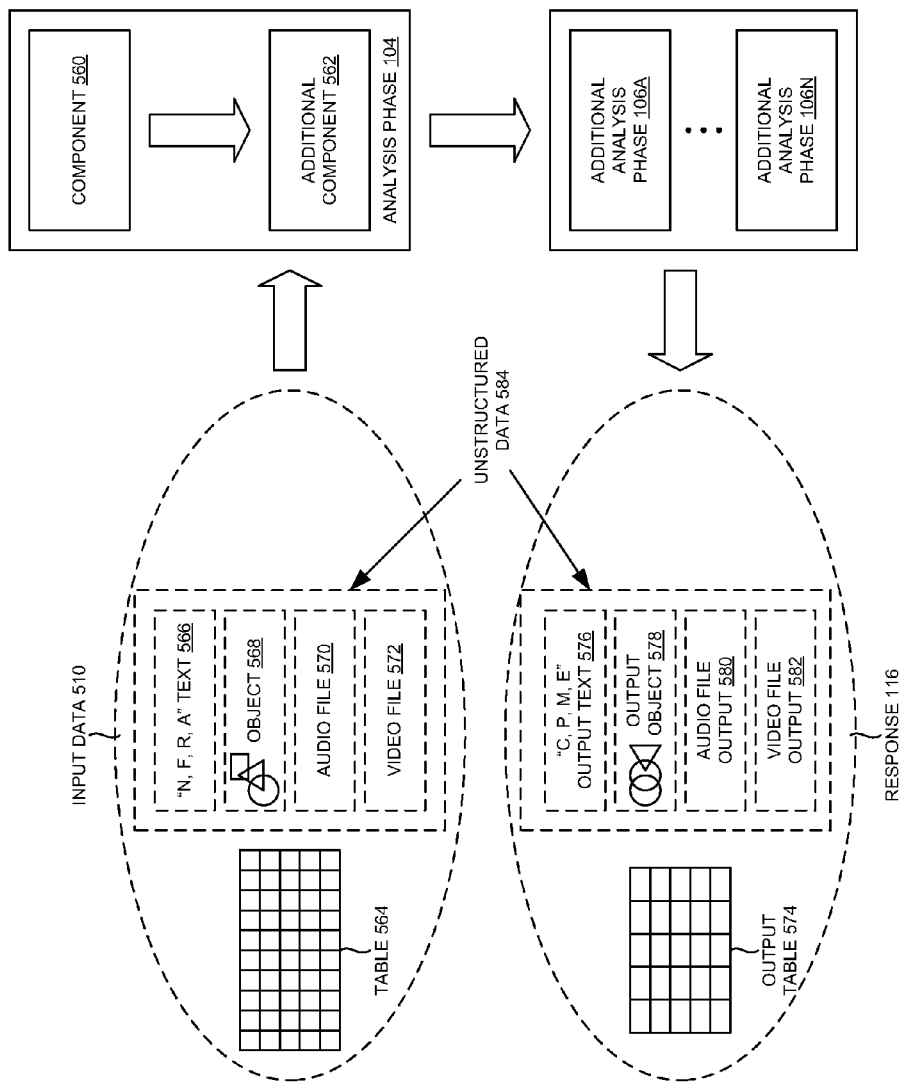
FIG. 5 is an illustration of processing input data to generate a query response, according to another embodiment.

The analysis phase 104 may process the query interpretation using the input data 510, which may be acquired from the database 108A-N. The input data 510 may include structured data and/or unstructured data 584, as illustrated in FIG. 5. The input data of the analysis phase may be generated using a combination of multiple data sources (e.g., multiple tables, storage devices, etc.). The portion of the input data used by a component of the analysis phase 104 may also be generated using a combination of multiple data sources.

The analysis phase 104 may communicate with a monitoring module 114 and/or the additional analysis phase 106A-N, which may be automatically distributed across the available computing environment (e.g., currently available servers, virtual machines, processors, etc.). The additional analysis phase 106A-N may access a greater amount of information that the amount of the input data 510 used by the analysis phase 104. The additional analysis phase 106A-N may operate in parallel, in series, or in any other pattern with the analysis phase 104.

The response 116 may be automatically assembled using a distributed output of the additional analysis phase 106A-N. The output of the additional analysis phase 106A-N may be distributed across multiple processors, servers, and/or virtual machines, and a complete resulting output may require an accumulation of all distributed parts of the additional analysis phase 106A-N output. The assembled output may be the response 116. The response 116 may be displayed through a user interface (e.g., a web browser, a terminal, a PC, a server, a monitor, etc.).

The monitoring module 114 may observe the input data 510 provided to the analysis phase 104, the available computing environment 112, the input to the additional analysis phase 106A-N, the processing of information by the additional analysis phase 106A-N, and the assembled response 116. The monitoring module 114 may manage the automatic distribution of the analysis phase 104 and/or the additional analysis phase 106A-N across the available computing environment 112. The monitoring module 114 may assemble the distributed output of the additional analysis phase 106A-N to generate the response 116.

The monitoring module 114 may detect a fault (e.g., an exception, a hardware failure, a system crash, a processor failure, a data error, a processing error, etc.) in the analysis phase 104 and/or the additional analysis phase 106A-N. The monitoring module 114 may automatically rectify an output effect (e.g., a data corruption, a propagating data error, a system failure, etc.) of the fault. The rectification may include one or more of reprocessing an operation (e.g., a component of the analysis phase 104, the additional analysis phase 106A-N, etc.), excluding a corrupted data, and/or logging a corrupted data. The rectification may include isolating a fault generating process and/or hardware mechanism. The monitoring module 114 may rectify an output effect automatically (e.g., without intervention by the developer 122 and/or analyst 120).

Figure 2:
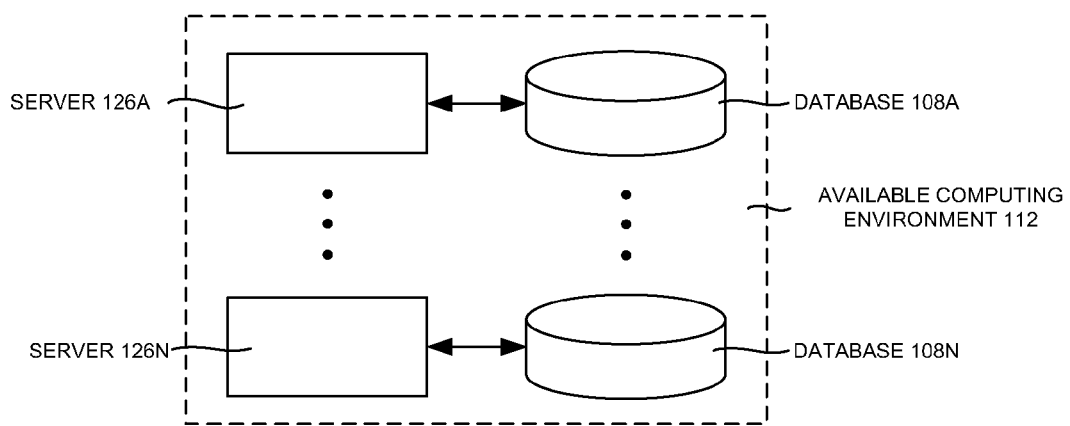
FIG. 2 is an exploded view of the available computing environment, according to one embodiment.

FIG. 2 is an exploded view of the available computing environment 112 illustrated in FIG. 1, according to one embodiment. In particular, FIG. 2 illustrates the available computing environment 112, the servers 126A-N, and the databases 108A-N, according to one embodiment. The available computing environment 112 may include one or more servers that are currently or will be open to process information within a preferred time frame. The servers 126A-N of the available computing environment 112 may be comprised of one or more separate servers, virtual machines, client devices, and/or separate processors of a single server. The servers 126A-N may communicate with one or more databases (e.g., databases 108A-N), which may be included within the available computing environment 112. The servers 126A-N and the databases 108A-N may communicate with each other via a LAN, a WAN, a MAN, and/or any other network arrangement. In addition, the databases 108A-N may include direct attached storage devices, volatile and/or non-volatile memory.

Figure 3:
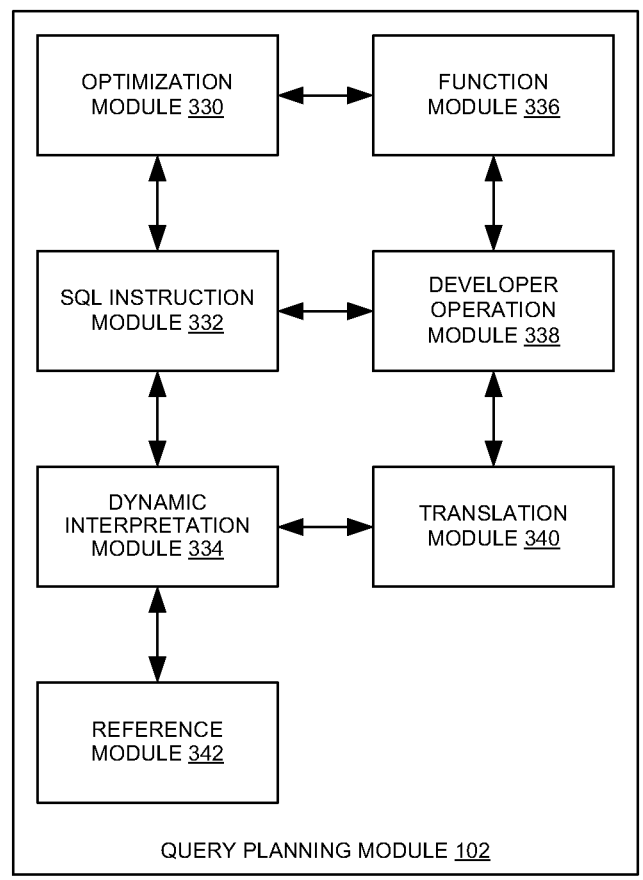
FIG. 3 is an exploded view of a query planning module, according to one embodiment.

FIG. 3 is an exploded view of the query planning module 102, according to one embodiment. In particular, FIG. 3 includes the query planning module 102, an optimization module 330, a SQL instruction module 332, a dynamic interpretation module 334, a function module 336, a developer operation module 338, a translation module 340, and a reference module 342.

The query planning module 102 may include multiple modules to perform various functions. For example, the optimization module 330 may optimize the analysis phase 104 and/or the additional analysis phase 106A-N using a parameter included with the customizable data request. The parameter may include a prediction and/or expectation regarding the response 116 (e.g., an output memory requirement, a number of generated responses, a range of response outputs, a type of input data 510, etc.). The SQL instruction module 332 may interpret a SQL command, a nested SQL instruction, etc.

The dynamic interpretation module 334 may dynamically determine a query interpretation of the customizable database request 124 based on a context (e.g., a scope and/or format of the customizable database request 124, an aspect of the input data 510, the available computing environment, etc.). The analysis may be dynamically altered in accordance with the query interpretation.

The function module 336 may alter the query interpretation based on a function (e.g., a predetermined function, an analyst and/or developer created function, etc.). The function may be an equation, a programming command, a sequence of commands, etc. The developer operation module 338 may generate the query interpretation based on an operation added and/or modified by a developer in the extensible computer process 100. The translation module 340 may generate the query interpretation by translating the customizable database request 124 from any language (e.g., a computer programming language such as SQL, Java, dBase, and/or a human language such as Indonesian, Russian, Spanish, and/or Chinese). The reference module 342 may provide an extensible computer process information about its context in the database request.

Figure 4:
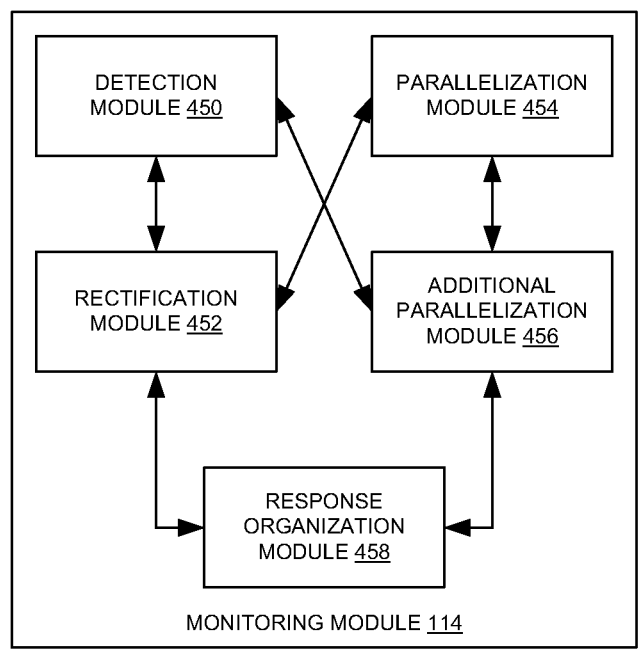
FIG. 4 is an exploded view of a monitoring module, according to another embodiment.

FIG. 4 is an exploded view of the monitoring module, according to another embodiment. In particular, FIG. 4 illustrates the monitoring module 114, a detection module 450, a rectification module 452, a parallelization module 454, an additional parallelization module 456, and a response organization module 458.

The detection module 450 may observe an input and/or an output of the analysis phase 104, the servers 126A-N, and the available computing environment 112, the additional analysis phase 106A-N. The detection module 450 may also observe the operation and transmitted data of the database 108A-N, the query planning module, and/or the extensible computer process 100. The detection module 450 may automatically detect a fault in the analysis phase 104 and/or the additional analysis phase 106A-N.

The rectification module 452 may automatically rectify an output effect (e.g., a process failure, a system crash, a corrupted data, a propagating failure, etc.) of the fault. The automatic rectification may include an isolation of the fault generating mechanism (e.g., a process, a server, a component, etc.). The automatic rectification may include re-executing an interrupted process (e.g., the analysis phase 104, the component, the additional analysis phase 106A-N, etc.). The automatic rectification may include logging the fault and/or the corrupted data. The rectified data may be excluded (e.g., from a query response, a repeated analysis phase 104, etc.).

The parallelization module 454 may automatically distribute the analysis phase of the query interpretation across an available computing environment. The additional parallelization module 456 may automatically distribute the additional analysis phase of the query interpretation across the available computing environment. The parallelization module 454 and/or the additional parallelization module 456 may consider a number of processors available, the number of analyses to be performed, and/or the sequence of the distributed processes.

The response organization module 458 may automatically assemble the response 116 using the distributed output of the additional analysis phase. The response organization module 458 may wait for a completion of all necessary processes prior to assembling the response 116. The response organization module 458 may further post process an output of each of the available processors when automatically assembling the response. The post processing may include a database operation, such as an aggregation operation, a sorting operation, and/or an invocation of a separate extensible computer process (e.g., an external program, a developer created function, a third-party software, etc.).

FIG. 5 is an illustration of processing input data to generate a query response, according to another embodiment. In particular, FIG. 5 illustrates the analysis phase 104, the additional analysis phase 106, the input data 510, the response 116, a component 560, an additional component 562, a table 564, text 566, an object 568, an audio file 570, a video file 572, an output table 574, an output text 576, an output object 578, an audio file 580, an output video file 582, and an unstructured data 584.

FIG. 5 illustrates a variety of types and forms that may be taken by the input data 510 and/or the response 116. The input data 510 may include the table 564, the text 566, the object 568, the audio file 570, and/or the video file 572. The input data 510 may be structured in a form including a database table and/or an output of a different database query. The response 116 may include the output table 574, the output text 576, the output object 578, the output audio file 580, and/or the output video file 582. The table 564 and/or the output table 574 may be structured data. The text 566, the object 568, the audio file 570, the video file 572, the output text 576, the output object 578, the output audio file 580, and/or the output video file 582 may be unstructured data 584. The input data 510 may be unstructured in a form including a content of a file in a computing environment. The unstructured data 584 may include a mix of data types, including images and audio files, text, programs, and/or word processing files.

The input data 510 may be communicated to the analysis phase 104, which may process the data in the component 560 and/or the additional component 562. The output of the analysis phase 104 may be received by the additional analysis phase 106A-N, which may generate the response 116. The additional analysis phase 106A-N may consist of one or more phases. The response 116 may be formed of the same and/or a different data type from the input data 510.

Figure 6:
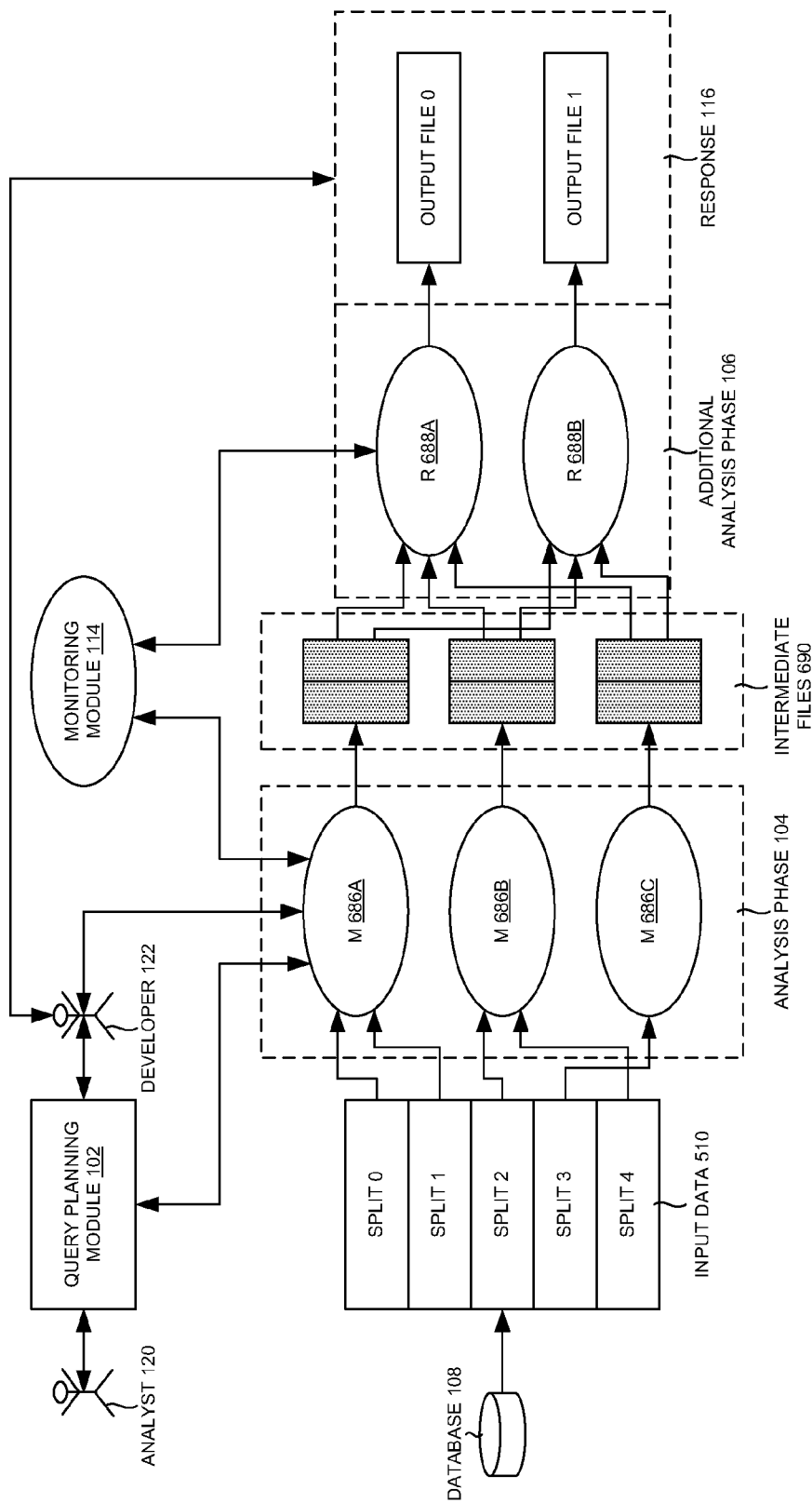
FIG. 6 is a system view of an alternate embodiment of processing of a customizable database query using a developer extensible operation and an available computing environment.

FIG. 6 is a system view of an alternate embodiment of processing of a customizable database query using a developer extensible operation and an available computing environment 112. In particular, FIG. 6 illustrates the query planning module 102, the analysis phase 104, the additional analysis phase 106, the database 108, the input data 510, the monitoring module 114, the response 116, the analyst 120, the developer 122, M 686A-C, R 688A-B, and intermediate files 690.

The query planning module 102 may receive a customizable database request 124 from the analyst 120. The developer 122 may contribute to and/or modify the customizable database request 124. The query planning module 102 may communicate a query interpretation to the analysis phase 104. The analysis phase 104 may receive an input data 510 from the database 108. The input data 510 may be divided into split 0-4. The analysis phase may include multiple components M 686A-C. The additional analysis phase 106 may include the R 688A-B. The M 686A-C may each represent a map operation performed on a limited data input (e.g., split 0 and 1, split 2 and 4, split 3, etc.). The M 686A-C may generate intermediate files 690, which may be communicated to the additional analysis phase 106. The R 688A-B may represent reduce operations in which the output of the map phases are accessible by each of the reduce operations. The R 688A-B of the additional analysis phase 106 may produce output file 0-1 (e.g., the response 116).

Figure 7:
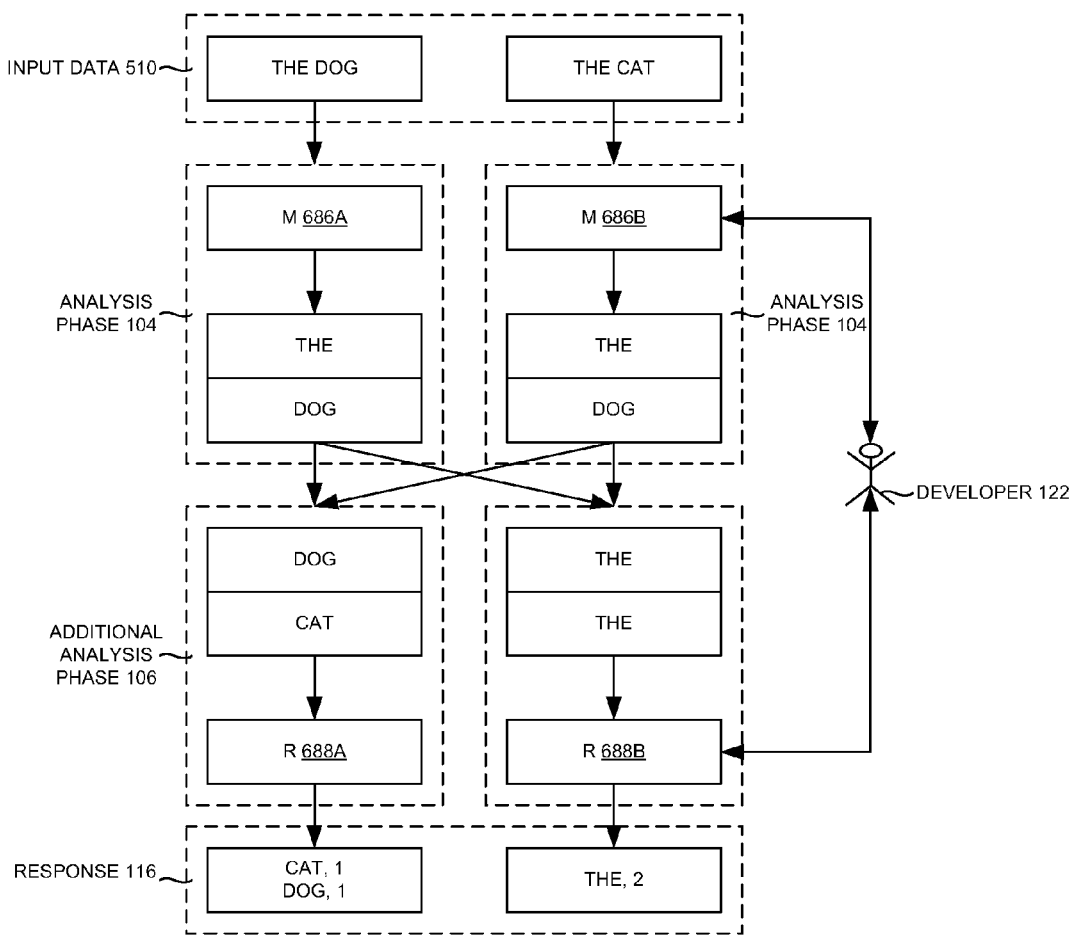
FIG. 7 is an illustration of processing input data to generate a query response, according to an alternate embodiment.

FIG. 7 is an illustration of processing input data to generate a response, according to an alternate embodiment. In particular, FIG. 7 illustrates the input data 510, the analysis phase 104, the additional analysis phase 106, the response 116, the developer 122, the M 686A-B and the R 688A-B.

The input data 510 may include two text files (e.g., the dog, the cat). The analysis phase 104 may separate the text files into separate parts (e.g., the, dog, the, cat, etc.). The output of the operations M 686A-B may be automatically redistributed to the parts of the additional analysis phase 106. The outputs of the operations M 686A-B may be sorted and/or categorized. The operations of the additional analysis phase, R 688A-B may form the response 116. The query response may include a count of each word (e.g., 1 "cat," 1 "dog," 2 "the," etc.). The M 686A-B may each be limited to a part of the input data 510. The R 688A-B may be capable of accessing all outputs of the analysis phase 104.

The developer 122 may customize and/or affect the operations (e.g., the M 686A-B, the R 688A-B, etc.) while the distribution of the analysis phase 104 and/or the additional analysis phase 106 are automatically handled.

Figure 8:
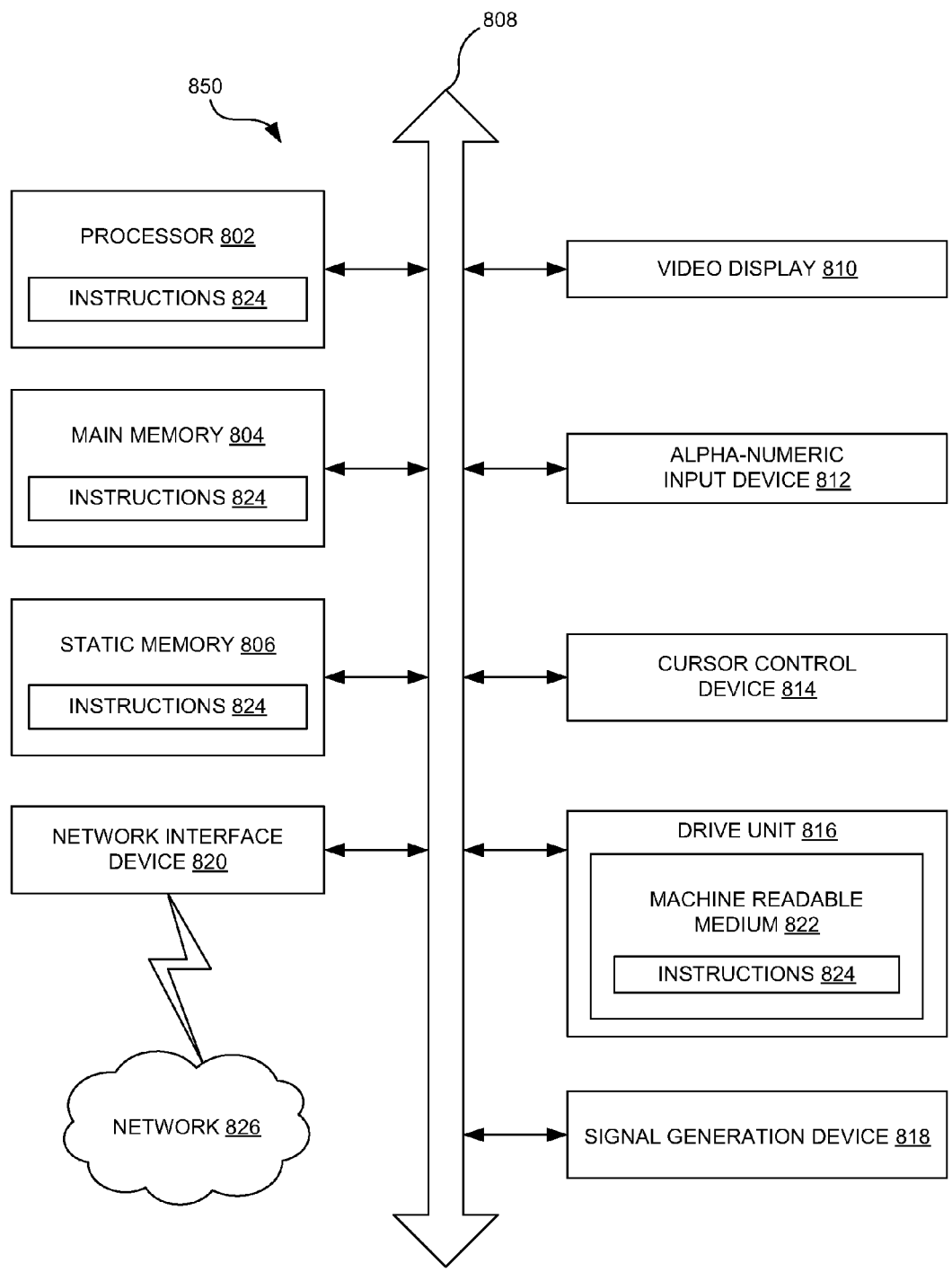
FIG. 8 is a diagrammatic system view of a data processing system in which any of the embodiments disclosed herein may be performed, according to one embodiment.

FIG. 8 is a diagrammatic system view of a data processing system in which any of the embodiments disclosed herein may be performed, according to one embodiment. Particularly, the diagrammatic system view 800 of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824, and a network 826, according to one embodiment.

The diagrammatic system view 800 may indicate a personal computer and/or the data processing system in which one or more operations disclosed herein are performed. The processor 802 may be a microprocessor, a state machine, an application specific integrated circuit, a field programmable gate array, etc. (e.g., Intel® Pentium® processor). The main memory 804 may be a dynamic random access memory and/or a primary memory of a computer system.

The static memory 806 may be a hard drive, a flash drive, and/or other memory information associated with the data processing system. The bus 808 may be an interconnection between various circuits and/or structures of the data processing system. The video display 810 may provide graphical representation of information on the data processing system. The alpha-numeric input device 812 may be a keypad, a keyboard and/or any other input device of text (e.g., a special device to aid the physically handicapped).

The cursor control device 814 may be a pointing device such as a mouse. The drive unit 816 may be the hard drive, a storage system, and/or other longer term storage subsystem. The signal generation device 818 may be a bios and/or a functional operating system of the data processing system. The network interface device 820 may be a device that performs interface functions such as code conversion, protocol conversion and/or buffering required for communication to and from the network 826. The machine readable medium 822 may provide instructions on which any of the methods disclosed herein may be performed. The instructions 824 may provide source code and/or data code to the processor 802 to enable any one or more operations disclosed herein.

Figure 9:
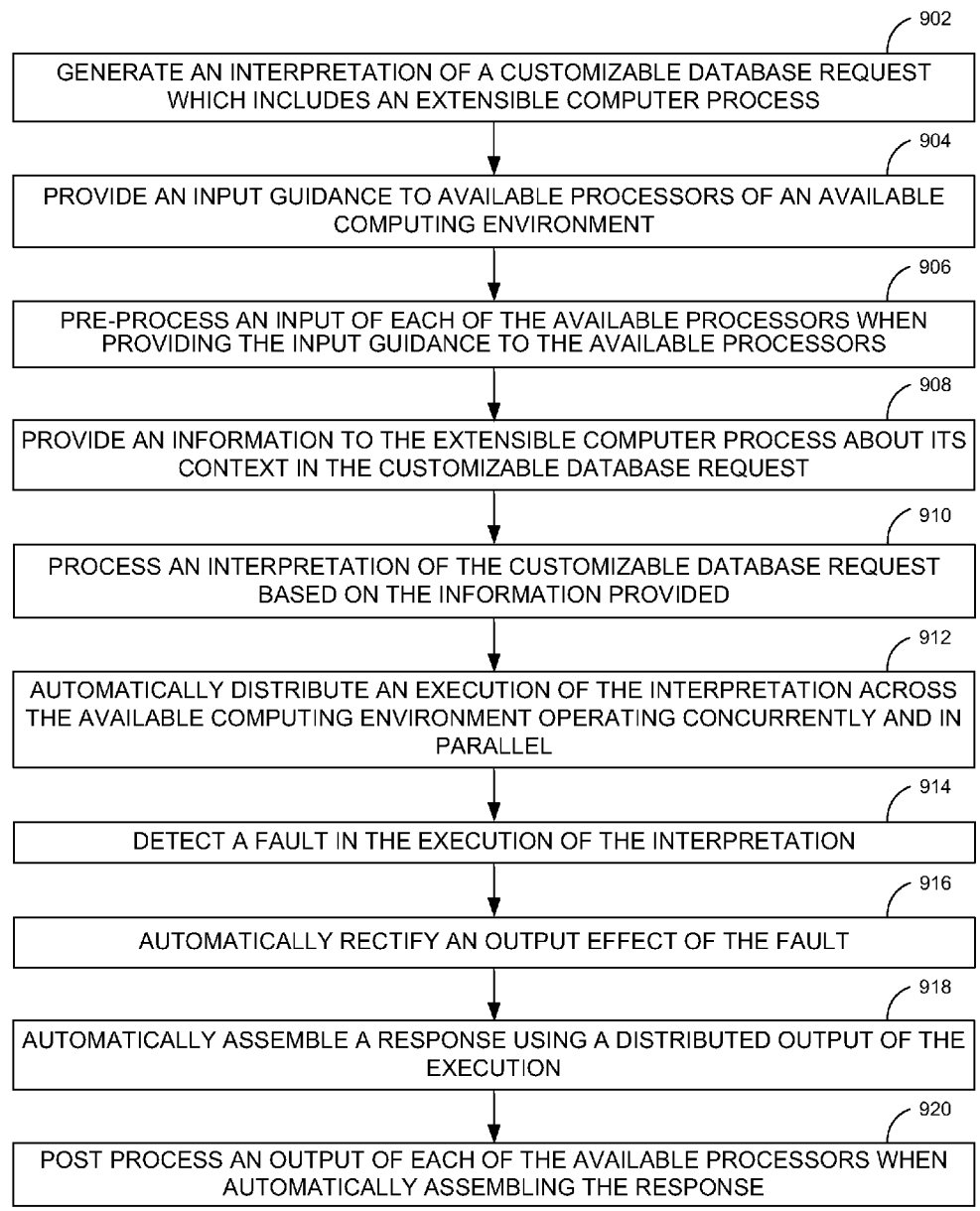
FIG. 9 is a process flow of interpreting and executing a customizable database request, according to one embodiment.

FIG. 9 is a process flow of interpreting and executing a customizable database request, according to one embodiment. In operation 902, an interpretation of a customizable database request may be generated (e.g., using the translation module 340 and/or the query planning module 102), which may include an extensible computer process. In operation 904, an input guidance may be provided to available processors of an available computing environment 112. In operation 906, an input of each of the available processors may be pre-processed (e.g., using the query planning module 102) when providing the input guidance to the available processors. In operation 908, an information may be provided to the extensible computer process about its context in the customizable database request (e.g., using the dynamic interpretation module 334 and/or the reference module 342). In operation 910, an interpretation of the customizable database request may be processed (e.g., using the query planning module 102) based on the information provided. In operation 912, an execution of the interpretation may be automatically distributed (e.g., using the analysis phase 104) across the available computing environment operating concurrently and in parallel (e.g., using the reference module 342). In operation 914, a fault may be detected (e.g., using the detection module 450 of the monitoring module 114) in the execution of the interpretation. In operation 918, a response may be automatically assembled (e.g., by the response organization module 458) using a distributed output of the execution. In operation 920, an output of each of the available processors may be post processed (e.g., by the response organization module 458) when automatically assembling the response.

Figure 10:
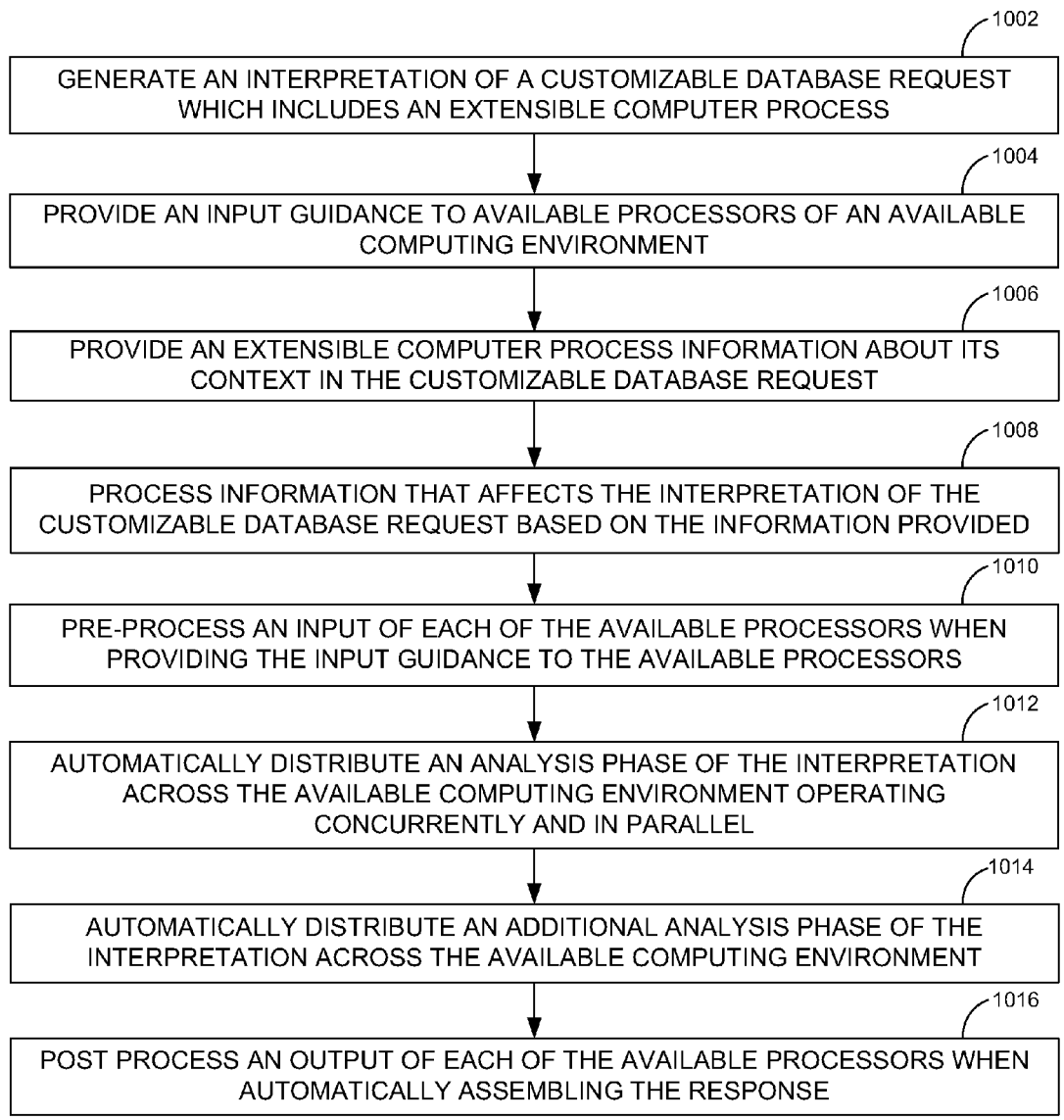
FIG. 10 is a process flow of automatically distributing an analysis phase and an additional analysis phase of the interpretation of a customizable database request across the available computing environment, according to one embodiment.

FIG. 10 is a process flow of automatically distributing an analysis phase and an additional analysis phase of the interpretation of a customizable database request across the available computing environment, according to one embodiment. In operation 1002, an interpretation of a customizable database request which includes an extensible computer process may be generated (e.g., using the SQL instruction module 332, the translation module 340, and/or the optimization module 330 of the query planning module 102). In operation 1004, an input guidance may be provided to available processors of an available computing environment. In operation 1006, an extensible computer process information may be provided information about its context in the customizable database request (e.g., using the reference module 342). In operation 1008, an information may be processed (e.g., using the dynamic interpretation module 334) that affects the interpretation of the customizable database request based on the information provided. In operation 1010, an input of each of the available processors may be pre-processed when providing the input guidance to the available processors. In operation 1012, an analysis phase of the interpretation may be automatically distributed (e.g., using the parallelization module 454) across the available computing environment operating computing environment operating concurrently and in parallel. In operation 1014, an additional analysis phase of the interpretation may be automatically distributed (e.g., using the additional parallelization module 456) across the available computing environment. In operation 1016, an output of each of the available processors may be post processed when the response is automatically assembled (e.g., using the response organization module 458).

The embodiments disclosed herein include an SQL extension providing extensibility to a parallel relational database management system at the sub-query level. One can compare this to a distributed computing infrastructure component that facilitates easy parallelization of customized applications in distributed computing environments. It should be understood that the various embodiment disclosed herein may be optimized and intended for parallel RDBMS users wanting to embed application logic within query processing. In contrast, one can compare this to facilitation of distributed applications to perform processing in a parallel manner.

Semantics: Embodiments disclosed herein may include a novel user-defined relational operator that processes input rows to produce output rows. Other approaches may include a function that processes <key, value-list> pairs to produce <key, aggregate-value-list> pairs, where aggregate-value-list is a function of the key and all the input<key, value-list>s' that have the same key.

User interface: Embodiments disclosed herein may include a novel SQL extension that is invoked within the context of an SQL statement as a user defined sub-query. Embodiments disclosed herein may confirm to the semantics and syntax of SQL sub-query. In contrast, other approaches may require invoking via a Command Line Interface(CLI); therefore, the semantics and syntax is defined by the processing model and function signature.

Processing model: An embodiment disclosed herein may include a novel an SQL extension that is processed within the framework of SQL processing (e.g., may go through: parsing, semantic checking, optimization, code generation and/or execution). In alternate embodiments, processing may include a different functions such as input splitting, map processing, spooling of intermediate output, reduce processing and/or output spooling.

Input/Output resolution: An embodiment disclosed herein may be self-describing and polymorphic so that input and output are resolved at query planning time into SQL types. Other approaches may not require well defined input/output types: the content of the key and the elements of the value list may be opaque to other frameworks.

Optimization: Embodiments disclosed herein may be executed as part of the containing SQL statement. Therefore, the various embodiments may make a best effort to heuristically explore different semantically equivalent execution orderings find the one that achieves the highest expected system utility. Other approaches, on the other hand, may rely on applications to hand craft the best execution strategy when MapReduce is employed.

Scheduling: Other approaches may employ a bin-packing algorithm for distributing work among hosts. This algorithm may help to reduces load balancing issues caused by data skews for a single pair of map-reduce processing. The embodiments disclosed herein may take a more comprehensive approach to scheduling. Scheduling for embodiments disclosed herein may be done both during query planning phase (that is static scheduling) and/or during execution phase (that is dynamic scheduling). The scheduling in each phase may employ a variety of algorithms which may include bin-packing. This comprehensive approach may be necessitated by the fact that map/reduce operators of embodiments disclosed herein may be part of an arbitrary complex relational operator graph.

Additional novel and non-obvious differentiators are described in the following section, which provides additional disclosure of the various approaches and benefits of embodiments disclosed herein.

Target Application

Other approaches may be targeted for special-purpose computations that may process large amount of raw data, such as crawled documents, web request logs, etc., to compute various kinds of derived data, such as inverted indices, various representations of the graph structure of web documents, summaries of the number of pages crawled per host, the set of most frequent queries in a given data, etc. Such computations may be conceptually straightforward. However, input data may be usually large and the computations may have to be distributed across hundreds or thousands of machines in order to finish in a reasonable amount of time. The issues of how to handle failures may conspire to obscure the original simple computation with large amounts of complex code to deal with these issues. As a reaction to this complexity, a MapReduce abstraction may be employed which allow expression of the simple computation as they were trying to perform but may hide the messy details of parallelization, fault-tolerance, data distribution and/or load balancing in a library. In other words, other approaches may be inspired by the map/reduce primitives present in Lisp and many other functional languages.

The embodiments disclosed herein may be designed as a new SQL UDF framework that may be inherently parallel, designed to embed parallel computation of procedural functions within the execution of SQL statements across hundreds of servers working together as a single relational database. The analysis of increasingly large amount of business data using SQL may be central to many enterprises' day-to-day operation and revenue generation. Relational databases may present SQL as a declarative interface to manipulate data. Relational query processing within relational databases may fall short of this task. Analysts may feel that SQL may be too limiting for the types of query they want to write that would extract value from the data, while others who may be less familiar with the declarative SQL may want to query the data using procedural languages that they may be more proficient in. Finally, relational database implementations may have imperfect query optimizers that sometimes may make poor choices. On big data, these imperfect choices may be often very costly, causing queries to fail or to continue to run for long periods of time, consuming valuable resources.

To address these issues, many relational database may support User-Defined Functions (UDFs) in which a developer can implement tasks using a procedural language. Unfortunately, the traditional UDF framework may have been designed for a single database instance, which parallelism may have been added as an afterthought, if at all. This may represent an increasingly significant shortcoming, since growing data sizes may demand a parallel approach to data processing and management across hundreds of database servers Semantics Other approaches may originate from functional programming language primitives: map and reduce. They, like the original primitives, may operate on a list of values and may produce an aggregate value list. Moreover, other approaches may group the values in the list according to a key. The user supplied map/reduce function may be invoked once for each <key, value-list> pair.

The embodiments disclosed herein may include a user-defined relational operator that takes a row stream as input and which may produce a row stream as output. Input rows may be read by the user-defined MR function one by one to compute the output rows.

User Interface

Other approaches may be invoked via a library call; thus, a user interface may be described as a programming model. In the programming model of other approaches, the computation may take a set of input key/value pairs. For example, the use of the MapReduce library expresses the computation as two functions: Map and Reduce. The Map function, written by the user, may take an input pair and may produce a set of intermediate key/value pairs. The MapReduce library may group together all intermediate values associated with the same intermediate key, I, and may pass them to the Reduce function.

The Reduce function, also written by the user, may accept an intermediate key, I, and a set of values for that key. It may merge together these values to form a possibly smaller set of values. For example, just zero or one output value may be produced per Reduce invocation. The intermediate values may be supplied to the user's reduce function via an iterator. This may allow the support of lists of values that may be too large to fit in the memory.

The map and reduce functions supplied by the user may have associated types:

```
map     (k1, v1)       -> list (k2, v2)
reduce  (k2, list(v2)) -> list (v2)
```

The input keys and values may be drawn from a different domain than the output keys and values. Furthermore, the intermediate keys and values may be from the same domain as the output keys and values. The user interface of embodiments disclosed herein, as an SQL extension, can described by it's syntax and functionality. The syntax for using embodiments disclosed herein function may be shown in the following:

```
SELECT ...
FROM functionname (
  on table-or-query
  [PARTITION BY expr, ... ]
    [ORDER BY, expr, ]
    [clausename(arg, ...) ...]
)
....
```

The embodiments disclosed herein function invocation may appear in the SQL FROM clause and may consist of the function name followed by a parenthetically enclosed set of clauses. The first, and the only strictly required clause, may be the ON clause, which may specify the input to this invocation of the embodiments disclosed herein function. The ON clause may contain a valid query.

The next clause in the embodiments disclosed herein invocation may be PARTITION BY, which may specify a comma-separated list of expressions used to partition the input to the embodiments disclosed herein function. These expressions may reference any attributes in the schema of the query or table reference specified by the ON clause.

The ORDER BY clause may follow the PARTITION BY clause and may specify a sort order for the input to the embodiments disclosed herein function. The ORDER BY clause may be only valid if a PARTITION BY clause has also been used. The ORDER BY clause may reference any attributes in the schema of the query or table reference contained in the ON clause and may accept a comma-separated list of any expressions that may be valid in a standard SQL ORDER BY clause.

Following the ORDER BY clause, a user may add any number of custom argument clauses. The form of a custom argument clause may be the clause name followed by a parenthesized list of comma-separated literal arguments.

The result of a function disclosed herein may be a relation; therefore, that result may participate in a query exactly the same way as any other valid table reference and/or sub-query that can also appear in the FROM clause of a query. A function disclosed herein may need not be the only expression in the FROM clause. For instance, the results of two functions disclosed herein may be joined to each other or to a table or sub-query.

Processing Model

The overall flow of an operation in other approaches may be summarized in the following: The MapReduce library in the user program may first split the input files into M pieces of typically 16-64 MB per piece. It then may start up many copies of the program on a cluster of machines.

One of the copies of the program may be special—the master. The rest may be workers that may be assigned work by the master. There may be M map tasks and R reduce tasks to assign. The master may pick idle works and assign each one a map task or reduce task, according to one embodiment.

A worker who may be assigned a map task may read the contents of the corresponding input split. It may parse key/value pairs out of the input data and may pass each pair to the user-defined Map function. The intermediate key/value pairs produced by the Map function may be buffered in memory.

Periodically, the buffered pairs may be written to local disk, partitioned into R regions by the partitioning function. The locations of these buffered pairs on the local disk may be passed back to the master, who may be responsible for forwarding these locations to the reduce workers, according to some embodiments.

When a reduce worker has read all intermediate data, it may sort by the intermediate keys so that all occurrences of the same key may be grouped together.

The reduce worker may iterate over the sorted intermediate data and, for each unique intermediate key encountered, it may pass the key and the corresponding set of intermediate values to the user's Reduce function. The output of the Reduce function may be appended to a final output file for this reduce partition.

When all map tasks and reduce tasks have been completed, the master may wake up the user program. At this point, the MapReduce call in the user program may return back to the user code. The implementation of the framework disclosed herein can be summarized as the interactions of the function disclosed herein with the query planning and query execution framework of the relational database.

The query planner may receive a parse tree of the query. It may resolve the input and output schema of the functions disclosed herein in a bottom-up traversal of the parse tree. When a function disclosed herein may be encountered in this traversal, the planner may use the already-defined schema of the input relations—along with the parsed argument clauses specified in the query for the function—to initialize the function by invoking the function's initializer routine. The initializer routine may decide the function's output columns that may be produced by the function's runtime routine during query execution.

The functions disclosed herein may be treated as an execution operator in the local Worker database: the rows of the input to the function may be provided from an iterator over the on clause while their output rows may be in turn provided into the next execution node up the execution tree. In the case of partitioned input, the rows may be divided into groups; this may be done either by sorting or hashing the rows according to the values of the PARTITION BY expressions.

The functions disclosed herein may be executed in parallel across all nodes, as well as in parallel across several threads at each node. The threads of a function disclosed herein may be executed in separate process from the local database process. Executing in a separate process may allow the externally-developed function code disclosed herein to be effectively sand-boxed and/or controlled using typical operating system mechanisms—for fault isolation, scheduling, resource limitation, forced termination, security, and so on—without relying on any particular programming language runtime environment to provide such functionality, according to one or more embodiment.

A function disclosed herein can either be a mapper or a reducer, which we call a row function or partition function, respectively. Functions disclosed herein may implement both interfaces if both modes of operation make sense for the function. Because of the integration of embodiments disclosed herein with SQL, it may be trivial to chain any combination of map and reduce functions disclosed herein together. To compare with other approaches, embodiments disclosed herein may allow an arbitrary number and ordering of map and reduce functions interspersed within a SQL query, where as MapReduce allows only one map followed by one reduce. Moreover, input to embodiments disclosed herein could come from an in-memory/communication queue and output could feed into another in-memory/communication queue since more than that one operator in the execution tree could be active simultaneously. This may be in sharp contrast to other approaches where input, intermediate-result and output may be all spooled to temporary files.

Input/Output Resolution

The input/output specification of other approaches could be described as:

| map | (k1, v1) | -> list (k2, v2) |
|---|---|---|
| reduce | (k2, list(v2)) | -> list (v2) |

The composition of the key and value and types of their attributes may be interpreted only by the user application.

The input/output of functions disclosed herein may be fully typed SQL variables. The input/output variables and their types may be determined during query planning time in a bottom-up traversal of the parse tree. When a function disclosed herein may be encountered in this traversal, the planner may use the already-defined schema of the input relations—along with the parsed argument clauses specified in the query for the function—to initialize the function by invoking the function's initializer routine. The initializer routine may decide the function's output columns that will be produced by the function's runtime routine during the query execution. The metaphor for the function may be one of a contract: the query planner may provide some guarantees about the input and the function may provide guarantees about its output, and both may be promising to meet these guarantees at query execution time.

Optimization

Some embodiments disclosed herein can be executed within a single SQL statement. Moreover, embodiments disclosed herein could appear in place of any table reference or sub-query. Therefore, there could potentially be many semantically equivalent execution orderings that have vastly different performance characteristics. Embodiments disclosed herein may make the best effort heuristically to enumerate different execution ordering and to pick the one that achieves highest expected system utility.

The computation of expected system utility may be based on information provided by embodiments disclosed herein such as: format of input/output data, how the output data may be sorted, how the output data may be partitioned, how the output data may be grouped, the statistics of the output and/or a distribution information.

Other approaches may be limited to one pair of map and reduce at a time. For example, each application may need to decide the best execution order when using multiple MapReduce along with other processing steps.

Scheduling

Other approaches may reduce load imbalance among hosts by using a bin-packing algorithm that could be summarized in the following:

A set of hosts, H, may be determined to perform the computation.

A partition, Ip, of input may be determined with cardinality of Ip>> cardinality of H.

Computation may be performed in the following way: Initially, in a round robin fashion may assign the next partition of Ip to the next idle host. When a host finishes a partition, assign the next unassigned partition of Ip to this idle host.

Embodiments disclosed herein may employ both static and dynamic scheduling to determine how best to take advantage of pipeline and horizontal parallelism. This scheduling framework may use information such as: table statistics, statistics provided by the embodiments disclosed herein operators, properties of the relational operators in the execution graph, the partition keys of table/index and/or ordering of intermediate results etc. Example scheduling algorithms could include but not limited to the following:

Pipeline parallelism could be used when input partition may be consistent with ordering key of a sort operator.

Partition level horizontal parallelism could be used when table/index partition key may be consistent with the join key for a hash join.

Partition ranges of the exchange operator could be determined dynamically using runtime sampling.

The scheduling of embodiments disclosed herein may also be integrated with access path and join order analysis since different plans may result in different scheduling optimization opportunities.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various structures and methods may be embodied using transistors, logic gates, and electrical circuits (e.g., application specific integrated (ASIC) circuitry and/or in Digital Signal Processor (DSP) circuitry).

Particularly, the extensible computer process 100, the query planning module 102, the analysis phase 104, the additional analysis phase 106A-N, the monitoring module 114, the user interface 118, the optimization module 330, the SQL instruction module 332, the dynamic interpretation module 334, the function module 336, the developer operation module 338, the translation module 340, the reference module 342, the detection module 450, the rectification module 452, the parallelization module 454, the additional parallelization module 456, the response organization module 458, the component 560, the additional component 562, the M 686A-C, and the R 688A-B of FIGS. 1-10 may be enabled using software and/or circuitry.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed:

1. A method of interpreting a customizable database request through a computing system comprising:

receiving the customizable database request;

generating, in a data processing device of the computing system, an interpretation of the customizable database request through an input data processing device of the computing system configured to execute an extensible computer process thereon, the data processing device being one of the input data processing device and another data processing device of the computing system, wherein the data processing device is configured to convert a plurality of programming languages into a preferred programming language, and wherein the data processing device executes instructions that convert the customizable database request into the preferred programming language when the customizable database request is in a programming language from the plurality of programming languages different from the preferred programming language, wherein the interpretation includes alternate responses to the customizable database request;

providing an input guidance to two or more processors of the computing system;

automatically distributing an execution of the interpretation in the computing system to operate concurrently, wherein a component of the execution is limited to at least a part of an input data associated with the customizable database request;

automatically assembling a response from the alternate responses using a distributed output of the concurrent execution, wherein the input guidance comprises certain portions of the input data, and wherein the customizable database request includes a parameter comprising one or both of a prediction or expectation regarding the response, and wherein the input guidance and the parameter are used to determine which of the two or more processors is to perform functions related to the at least the part of the input data;

detecting a fault in the execution of the interpretation; and automatically rectifying an output effect of the fault, wherein rectifying the output effect of the fault includes reprocessing an operation, excluding a corrupted data, and logging the corrupted data, wherein the customizable database request comprises at least one of a predetermined function, a developer created function, and an analyst created function.

2. The method of claim 1, further comprising:

providing an information to the extensible computer process about a context thereof in the customizable database request;

processing an interpretation of the customizable database request based on the information provided, wherein the extensible computer process is a developer provided-computer program, and wherein the information provided includes at least one of a format of the input data and an output data, whether the input data and the output data are ordered and in which form, grouping information, statistics of the input data and the output data, a distribution information, a length of the input data and the output data, and a custom parameter, wherein the custom parameter is at least one of a number, a string, a list of numbers of strings, a content of a file in the available computing environment, and a result of the customizable database request; and post-processing an output of each of the processors when automatically assembling the response, wherein the post-processing includes at least one database operation including at least one of an aggregation operation, a sorting operation, and an invocation of another extensible computer process.

3. The method of claim 1, further comprising pre-processing an input of each of the processors when providing the input guidance thereto wherein the customizable database request specifies the input data for the extensible computer process, wherein the input data is structured in a form comprising at least one of a database table and an output of a different database query, and wherein the input data is unstructured in a form comprising a content of at least one file in a computing environment.

4. A computing system comprising:

two or more processors;

at least one data processing device comprising at least one processor associated therewith, receiving a customizable database request and configured to execute an extensible computer process thereon, wherein the at least one data processing device is configured convert a plurality of programming languages to a preferred programming language, and wherein the at least one data processing device executes instructions that convert the customizable database request into the preferred programming language when the customizable database request is in a programming language from the plurality of programming languages different from the preferred programming language, and wherein the plurality of programming languages includes at least one non-database query language, and wherein the at least one data processing device is configured to:

generate an interpretation of the customizable database request, provide input guidance to the two or more processors of the computing system, automatically distribute an execution of the interpretation to the two or more processors of the computing system to operate concurrently, wherein a component of the execution is limited to at least a part of an input data associated with the customizable database request, automatically assemble a response using a distributed output of the concurrent execution, wherein the input guidance comprises certain portions of the input data, and wherein the customizable database request includes a parameter comprising one or both of a prediction or expectation regarding the response, and wherein the input guidance and the parameter are used to determine which of the two or more processors of the computing system is to perform functions related to the at least the part of the input data, provide the extensible computer process information about a context thereof in the database request, process information that affects the interpretation of the database request based on the information provided, detect a fault in the execution of the interpretation, and automatically rectify an output effect of the fault, wherein rectifying the output effect of the fault includes reprocessing an operation, excluding a corrupted data, and logging the corrupted data, wherein the customizable database request comprises at least one of a predetermined function, a developer created function, and an analyst created function, wherein the extensible computer process is a developer provided-computer program, and wherein the information provided includes a format of the input data and an output data.

* * * * *